US012720279B2

(12) United States Patent
Reddy

(10) Patent No.: US 12,720,279 B2
(45) Date of Patent: Aug. 25, 2026

(54) ITERATIVE SUB-SELECTION OF ELECTRONIC SHELF LABEL (ESL) DEVICES FOR POSITIONING

(71) Applicant: QUALCOMM Incorporated, San Diego, CA (US)

(72) Inventor: Varun Amar Reddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 18/521,282

(22) Filed: Nov. 28, 2023

(65) Prior Publication Data

US 2025/0175762 A1 May 29, 2025

(51) Int. Cl.
*H04L 1/00* (2006.01)
*G09F 3/20* (2006.01)
*H04W 4/029* (2018.01)

(52) U.S. Cl.
CPC ............ *H04W 4/029* (2018.02); *G09F 3/204* (2013.01); *G09F 3/208* (2013.01)

(58) Field of Classification Search
CPC ......... H04W 4/029; H04W 4/33; G09F 3/204; G09F 3/208
USPC ........................................................ 455/456.1
See application file for complete search history.

(56) References Cited

U.S. PATENT DOCUMENTS

| | | | | |
|---|---|---|---|---|
| 2022/0051310 | A1* | 2/2022 | Graube | G06Q 10/087 |
| 2023/0281684 | A1* | 9/2023 | Ross | G06Q 30/0639 705/26.1 |
| 2024/0046822 | A1* | 2/2024 | Miyamoto | H04W 4/80 |
| 2024/0144354 | A1* | 5/2024 | Glaser | G06Q 10/087 |
| 2025/0218190 | A1* | 7/2025 | Schwarz | H04N 23/56 |

* cited by examiner

*Primary Examiner* — Tanmay K Shah
(74) *Attorney, Agent, or Firm* — Norton Rose Fulbright US LLP

(57) ABSTRACT

This disclosure provides systems, methods, and devices for Electronic Shelf Label (ESL) systems that support indoor positioning of target devices. In a first aspect, a method includes: receiving, by a server from ESL nodes, first positioning measurements for a target device; determining, by the server, a first position of the target device based on the first positioning measurements; determining, by the server, a first subset of the ESL nodes in a first area corresponding to the first position; and determining, by the server, a second position of the target device based on second positioning measurements received for the target device from the first subset. Other aspects and features are also claimed and described.

30 Claims, 10 Drawing Sheets

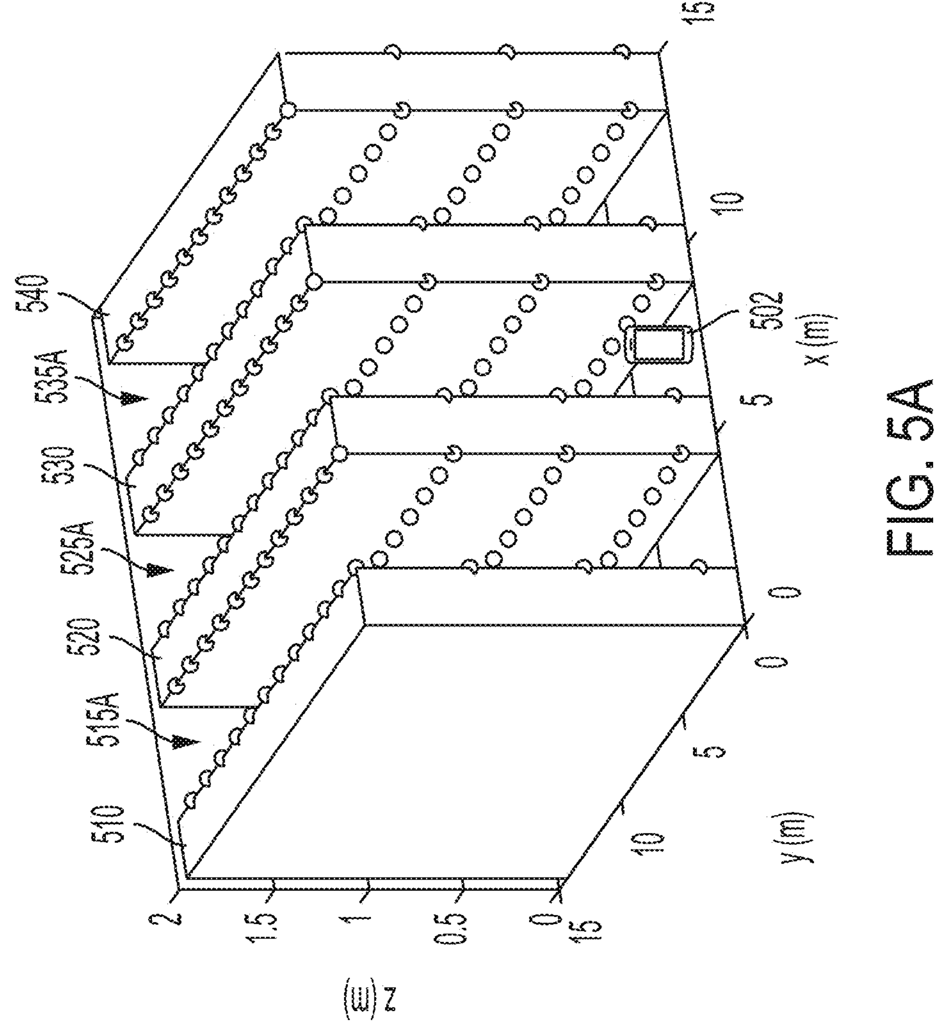
FIG. 5A
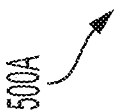

ITERATIVE SUB-SELECTION OF ELECTRONIC SHELF LABEL (ESL) DEVICES FOR POSITIONING

TECHNICAL FIELD

Aspects of the present disclosure relate generally to electronic shelf label (ESL) systems, and more particularly, to methods and systems for positioning of user devices in an indoor environment using an ESL system deployed within the environment.

INTRODUCTION

In general, retail stores use paper labels to display information about products displayed on shelves, such as prices, discount rates, unit costs, origins, or the like. Using such paper labels for the price display has limitations. For example, when there are changes in product information or locations on shelves, the retailer must generate new paper labels and discard old ones. This raises costs for maintenance in both supplies and employee labor. Further, in environmental terms, replacing the labels wastes raw materials such as paper, which adversely affects the protection of the environment. Still further, humans are prone to make mistakes, such as mislabeling a shelf or product or forgetting to take down temporary price changes on certain shelving, which results in shopper frustration.

Electronic shelf label (ESL) devices are electronic devices for displaying price or other relevant information for items on retail store shelves, which may be used in place of paper labels. ESL devices may be attached to a front edge of retail shelving and display a variety of information using display devices, such as Liquid Crystal Displays (LCD) or electronic ink (e-ink) displays. Whenever the information about a product or the location of a product is changed, the ESL device may be programmed with new product information. Thus, the same electronic shelf label can be repeatedly used.

The devices or nodes of an ESL system may be equipped with Bluetooth Low Energy (BLE) radios that can be used to track the location of a BLE-enabled device based on the known locations of nearby ESL devices within a retail environment. However, ESL systems introduce unique positioning-related challenges for BLE devices within a retail environment due in part to the large-scale, dense deployment of ESL devices typically found within these environment, where overlapping signals from ESLs across multiple aisles can skew positioning measurements and lead to inaccurate position estimates.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Electronic shelf label (ESL) devices may be used in a wireless network to provide information and services to shoppers and retailers (as users of an ESL system) within an environment (such as a retail environment associated with a retail store or a distribution warehouse). For example, ESL devices operating on a wireless network as part of ESL system may support indoor positioning services to identify the position of ESL devices within the environment (e.g., on shelves of different gondolas located within a retail store). As another example, the ESL system may support positioning services to determine a position of a user within the environment by interacting with the user's mobile device. As still another example, the ESL system may employ the positioning services to determine a position of an object (e.g., a product or other asset of the retail store) within the environment by interacting with an electronic tag (e.g., a radio frequency identification (RFID) or near field communication (NFC) tag) placed on the object.

In some embodiments, a server of the ESL system may use radio frequency (RF) measurements of positioning signals exchanged between a target device and various ESL devices or nodes of the ESL system to estimate or determine a position of the target device within the environment. The target device may be, for example, a mobile device of a user (e.g., a retail store worker or customer). Alternatively, the target device may be an electronic tag placed on an object (e.g., a product or other inventory item) being tracked within the environment. The RF measurements may include, for example, received signal strength indicators (RSSIs) of the positioning signals received by the ESLs from the target device. These measurements may be used by the server to estimate or determine a position of the target device over different iterations of a positioning process. To improve positioning accuracy, a smaller subset of the ESL devices/nodes (or "ESLs") in a vicinity of the target device (e.g., ESLs in the same aisle, on the same gondola, or on the same shelf) may be identified or selected at each iteration of the process based on a known topology of the ESLs within the environment and one or more selection criteria. The selection criteria may include, for example, a minimum RSSI criterion and a maximum number criterion, which limit the identified/selected ESLs to a maximum number of ESLs for which the RSSIs are above the minimum RSSI (and the strongest). The RF measurements (e.g., RSSIs) of the positioning signals exchanged with the identified subset at each iteration may then be used to determine a new or updated position of the target device. The position of the target device determined at each iteration may be further refined over one or more subsequent iterations, e.g., until a desired level of granularity or ESL sub-selection (e.g., at the gondola-level or shelf-level) is reached or until an associated positioning error falls below a maximum positioning error tolerance.

Accordingly, the disclosed positioning techniques allow an initial position estimate or coarse location of the target device to be refined over multiple iterations of a positioning process based on positioning measurements collected using a different subset of the ESLs identified or selected at each iteration. The disclosed techniques may be particularly useful for addressing the positioning-related challenges associated with large-scale, dense deployments of ESL systems within indoor environments.

In one aspect of the disclosure, a method includes: receiving, by a server from electronic shelf label (ESL) nodes, first positioning measurements for a target device; determining, by the server, a first position of the target device based on the first positioning measurements; determining, by the server, a first subset of the ESL nodes in a first area corresponding to the first position; and determining, by the server, a second position of the target device based on second positioning measurements received for the target device from the first subset.

In an additional aspect of the disclosure, an apparatus includes at least one processor and a memory coupled to the at least one processor. The at least one processor is configured to execute the processor-readable code to cause the at least one processor to perform operations comprising: receiving, from electronic shelf label (ESL) nodes, first positioning measurements for a target device; determining a first position of the target device based on the first positioning measurements; determining a first subset of the ESL nodes in a first area corresponding to the first position; and determining a second position of the target device based on second positioning measurements received for the target device from the first subset.

In an additional aspect of the disclosure, a non-transitory computer-readable medium stores instructions that, when executed by a processor, cause the processor to perform operations. The operations include: receiving, from electronic shelf label (ESL) nodes, first positioning measurements for a target device; determining a first position of the target device based on the first positioning measurements; determining a first subset of the ESL nodes in a first area corresponding to the first position; and determining a second position of the target device based on second positioning measurements received for the target device from the first subset.

In an additional aspect of the disclosure, an electronic shelf label (ESL) system, comprising: ESL nodes; and a server comprising a memory and at least one processor coupled to the memory, wherein the at least one processor is configured to perform operations comprising: receiving, from the ESL nodes, first positioning measurements for a target device; determining a first position of the target device based on the first positioning measurements; determining a first subset of the ESL nodes in a first area corresponding to the first position; and determining a second position of the target device based on second positioning measurements received for the target device from the first subset.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

Devices, networks, and systems may be configured to communicate via one or more portions of the electromagnetic spectrum. The present disclosure describes certain aspects with reference to certain communications technologies, such as Bluetooth or Wi-Fi. However, the description is not intended to be limited to a specific technology or application, and one or more aspects described with reference to one technology may be understood to be applicable to another technology. Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus, and methods described herein may be applied to other communications systems and applications than the particular examples provided.

For example, the described implementations may be implemented in any device, system, or network that is capable of transmitting and receiving RF signals according to any of the wireless communication standards, including any of the IEEE 802.11 standards, the IEEE 802.15.1 Bluetooth® standards, Bluetooth low energy (BLE), code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, 5G New Radio (5G NR), 6G, or other known signals that are used to communicate within a wireless, cellular, or internet of things (IOT) network, such as a system utilizing 3G, 4G 5G, or 6G technology, or further implementations thereof.

In various implementations, the techniques and apparatus may be used in wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably and may refer to a collection of devices capable of communicating with each other through one or more communications techniques.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, or packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.).

Implementations may range from chip-level or modular components to non-modular, non-chip-level implementations and further to aggregated, distributed, or original equipment manufacturer (OEM) devices or systems incorporating one or more described aspects. In some settings, devices incorporating described aspects and features may also include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, or constitutions.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a device is described as containing components A, B, or C, the device may contain A alone; B alone; C alone; A and B in combination; A and C in combination; B and C in combination; or A. B. and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5A is a diagram illustrating an example topology of ESL devices deployed across multiple aisles according to some embodiments of this disclosure.

Like reference numbers and designations in the various drawings indicate like elements.

DETAILED DESCRIPTION

Figure 1A:
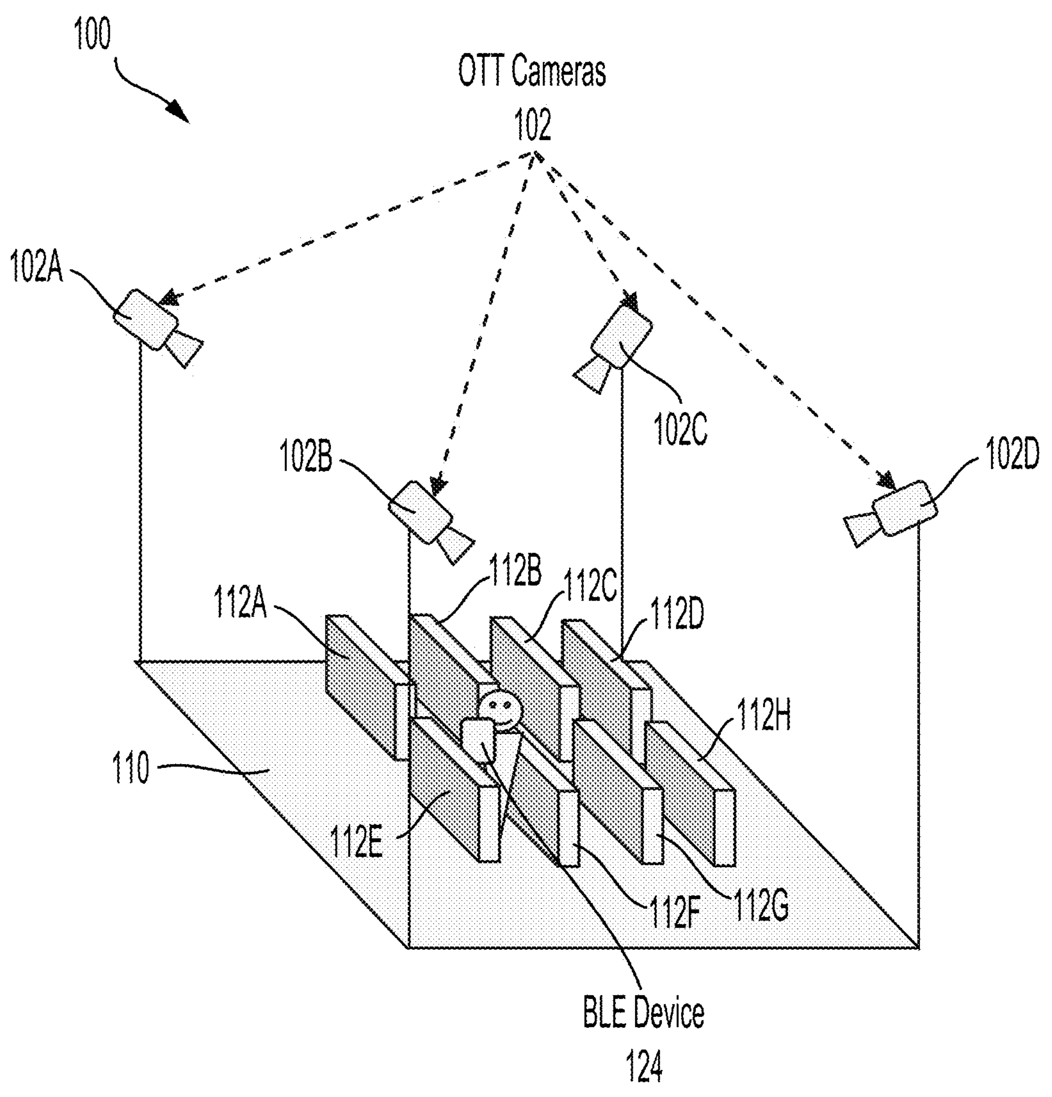
FIG. 1A is a block diagram illustrating a perspective view of an example Electronic Shelf Label (ESL) system within an indoor environment according to some embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support indoor positioning of user devices or objects within an indoor environment, such as a retail environment corresponding to a floor space of a retail store or distribution warehouse. In some embodiments, an Electronic Shelf Label (ESL) system may be deployed within the environment for purposes of monitoring or tracking assets (e.g., product locations) and providing indoor positioning and navigation services for users (e.g., customers or store employees) within the environment. The ESL system may include a dense deployment of ESL devices on different gondolas across multiple aisles throughout the environment. Each gondola may include multiple shelves and each shelf may include one or more ESL devices, e.g., for displaying pricing and other relevant information regarding products placed on the shelf. The ESL devices may represent different nodes of the ESL system deployed at known locations throughout the environment.

Particular implementations of the subject matter described in this disclosure may be implemented to realize one or more of the following potential advantages or benefits. In some aspects, the present disclosure provides indoor positioning techniques for wireless communication systems that may be particularly beneficial in ESL applications for indoor navigation, asset tracking, and inventory management. For example, the disclosed techniques may be used to provide an iterative positioning process that utilizes a known topology of ESL nodes (or "ESLs") deployed within the environment to estimate or determine the position of a target device. The target device may be, for example, a mobile device of a user (e.g., a retail store worker or customer) or an electronic tag placed on an object (e.g., a product or other inventory item) being tracked within the environment. Position estimates for target devices in such environments are typically determined based on radio frequency (RF) measurements of positioning signals, e.g., received signal strength indicators (RSSIs), collected by ESLs deployed in a vicinity of the target device. However, due to the dense deployment of ESLs within the environment, a position estimate derived using conventional techniques for a target device located in a particular aisle may get skewed by measurements from ESLs in other aisles (e.g., one or more adjacent aisles) and thus, incorrectly place the device in the wrong aisle.

To improve positioning accuracy in such an environment, the disclosed iterative positioning techniques may use the known topology of ESLs together with one or more selection criteria to identify or select smaller subsets of ESLs in a vicinity of the target device over different iterations of a positioning process. The positioning measurements collected by the subset of ESLs selected at each iteration may be used to determine or update a position of the target device within the environment. For example, a first iteration of the positioning process may produce a first estimate of the target device's position based on RF measurements (e.g., RSSIs) of positioning signals collected for the target device by ESLs deployed across multiple aisles in an area of the environment where the target device is generally located. This first position estimate may represent, for example, a coarse location of the target device based on a weighted average of the known locations of the corresponding ESLs in the surrounding area. The known topology of ESLs relative to the first position (or coarse location) of the device may be used to identify or select a first subset of the ESLs whose known locations are within a first area corresponding to the first position (e.g., within the same aisle as the target device). A server of the ESL system may also trigger the ESLs in the first subset to wake up and listen for and/or receive positioning signals from the target device. Additional positioning measurements collected by the first subset for the target device may be used to determine a second, more precise position of the target device. One or more additional subsets of ESLs located closer to the target device (e.g., a second subset of ESLs on the same gondola and a third subset of ESLs on the same shelf of the gondola) may be identified and used to obtain additional positioning measurements for the target device during one or more subsequent iterations of the positioning process. As the subset (and number) of ESLs identified at each iteration grows smaller and relatively closer to the actual position of the target device, the positioning measurements obtained from these ESLs may be used to further refine the position of the target device and improve positioning accuracy over the course of the positioning process.

As will be described in further detail below, the known topology of ESLs may indicate, for example, a specific arrangement of ESL nodes on one or more gondolas (including their horizontal and vertical geometry across different shelves of each gondola) in a vicinity of the target device's position. Accordingly, such topology information may be useful in excluding or filtering out any ESLs that have relatively strong RSSIs (e.g., above the minimum RSSI criterion) but are located in a different aisle (such as on an adjacent aisle) from that of the other identified ESLs. In some implementations, the known topology of the ESLs may be combined with other relevant information that may be available at each iteration of the process to identify a corresponding subset of ESLs. Such information may include, for example, visual data (such as images and/or video captured by one or more cameras installed within the environment), which may be used to determine or confirm a position of the target device within the environment.

In some embodiments, the subset of ESLs identified or selected at each iteration of the positioning process may be based on the position of the target device determined during a previous iteration relative to the known topology of the ESLs and one or more selection criteria. The selection criteria may include, for example, a minimum RSSI criterion and a maximum number criterion. The minimum RSSI criterion may specify a minimum RSSI threshold for ESLs in to be selected such that only ESLs with the strongest RSSIs are selected. The maximum number criterion may specify a maximum limit the quantity of identified/selected ESLs to some maximum number. The values of the minimum RSSI threshold and maximum number may be set as desired for a particular implementation.

In some implementations, one or more of the selection criteria may correspond to hyperparameters of a model used by the server to perform each iteration of the positioning process. Such hyperparameters may include, for example, the number of ESLs in a particular area of the environment corresponding to a position of the target device determined at each iteration and a ranking metric (e.g., one or more weights representing a priority level or factor) associated with each ESL in the particular area. Accordingly, a unique set of hyperparameters may be used for each level of ESL sub-selection (or each subset of ESLs selected at each iteration) of the positioning process. For example, a first set of hyperparameters may be used to estimate a first position of the target device for a first iteration of the process based on measurements of all available ESLs (e.g., ESLs across multiple aisles), a second set of hyperparameters may be used to estimate a second position of the target device for a second iteration of the process based on measurements of a subset of the ESLs (e.g., ESLs corresponding to the same aisle), and a third set of hyperparameters may be used to estimate a third position of the target device for a third iteration of the process based on measurements of a smaller subset of the ESLs (e.g., ESLs on the same gondola).

While the following examples will be described below in the context of a retail environment, it should be appreciated that embodiments of the present disclosure are not intended to be limited thereto and that the disclosed iterative positioning (or position estimation) techniques may be applied to any of various indoor environments.

FIG. 1A is a block diagram illustrating a perspective view of an example ESL system 100 according to some embodiments of this disclosure. As shown in FIG. 1A, the ESL system 100 may be deployed across multiple aisles of gondolas 112A-112H within a retail environment 110. The retail environment 110 may include, for example, a floor space of a retail store, such as a grocery or department store. As will be described in further detail below, each of the gondolas 112A-112H may include a plurality shelves and one or more ESL devices may be attached to each shelf. The ESL devices may be used to display pricing and/or other information related to products located on the corresponding shelves. In some implementations, each of the gondolas 112A-112H, each shelf of the respective gondolas 112A-112H, and each aisle between the gondolas 112A-112H may be assigned a unique identifier to distinguish it from other aisles, gondolas, and shelves in the retail environment 110. Each ESL device may be equipped with one or more wireless radios for transmitting and receiving information over a wireless network associated with the retail store. Such radios may support any of various wireless communication standards and technologies. Examples of such technologies include, but are not limited to, Bluetooth, Bluetooth Low Energy (BLE), 5G NR, ultra-wideband (UWB), and other RF technologies.

In some implementations, cameras may be installed on or near the shelves at the ends of the gondolas 112A-112H to capture different views of the aisles between the gondolas 112A-112H and/or other pathways in the areas surrounding the gondolas 112A-112H. Additionally, over-the-top (OTT) cameras 102A-102D (or "OTT cameras 102" collectively) may be positioned at different overhead locations throughout the retail store to capture larger areas of the retail environment 110. In some implementations, the OTT cameras 102 may be part of a surveillance system of the retail store in which the OTT cameras 102 are used for security and monitoring purposes.

In some embodiments, images and/or video captured by the OTT cameras 102 and/or those captured by the shelf cameras on the gondolas 112A-112H may serve as visual channel state information (CSI) that can be used to determine or confirm the position of one or more ESL devices within the retail environment 110. In some implementations, such information may also be used to determine or confirm a position of a target device, such as a BLE device 124, within the retail environment 110. The BLE device 124 may be, for example, a mobile device of a user (e.g., a customer or employee of the retail store). Alternatively, the BLE device 124 may be an electronic tag, such as an ambient Internet of Things (IoT) tag, a radio frequency identification (RFID) tag, or a near field communication (NFC) tag, placed on an object (e.g., a product or other inventory item) being tracked within the retail environment 110. The BLE device 124 and each ESL device may be equipped with a wireless radio (e.g., a BLE radio) for transmitting and/or receiving positioning signals (e.g., low power beacons). As will be described in further detail below with respect to FIG. 1B, radio frequency (RF) measurements of such signals transmitted by the BLE device 124 and collected by ESL devices in a vicinity of the BLE device 124 may be provided to a management server of the ESL system 100 for determining the position of the BLE device 124 using the iterative positioning techniques disclosed herein.

Figure 1B:
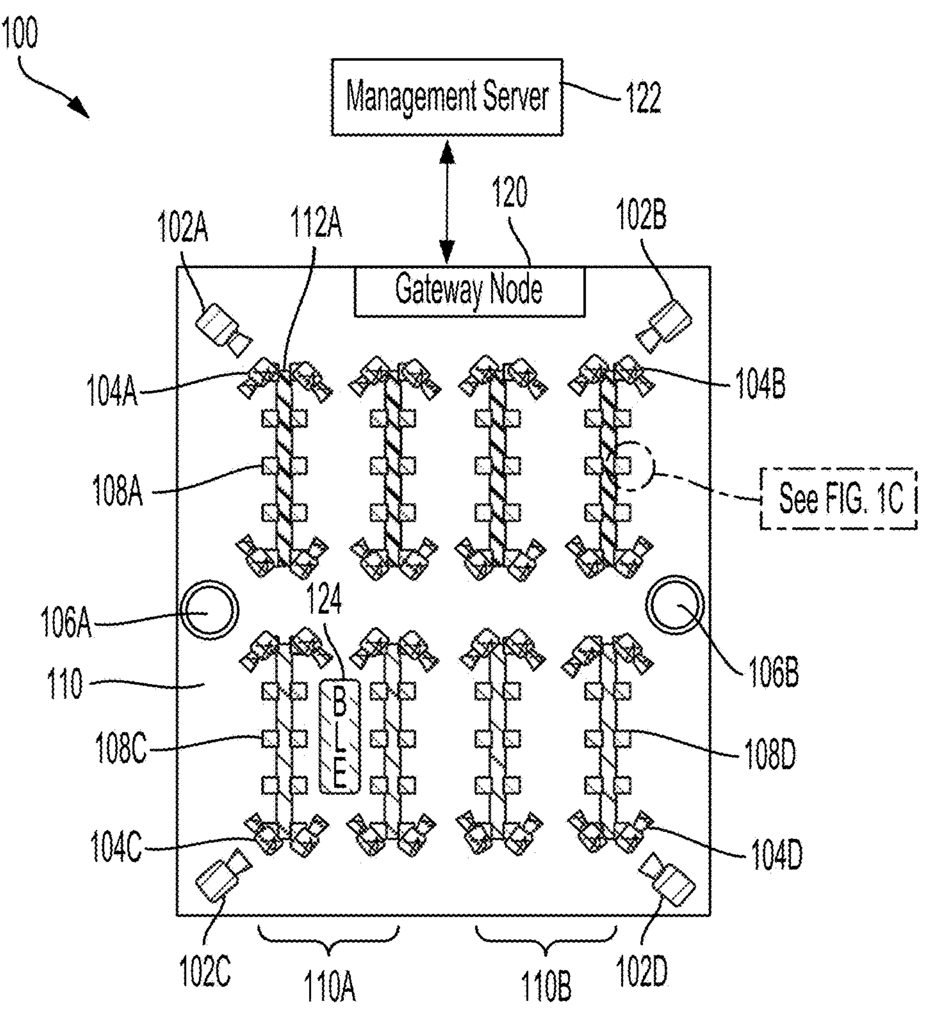
FIG. 1B is a block diagram of an overhead view of the ESL system of FIG. 1A according to some embodiments of this disclosure.

FIG. 1B is a block diagram of an overhead view of the ESL system 100 of FIG. 1A according to some embodiments of the disclosure. As shown in FIG. 1B, the ESL system 100 may further include a management server 122 that is integrated with or communicatively coupled to a gateway node 120. The management server 122 may include at least one processor coupled to a memory, which may be a non-transitory computer-readable medium for storing instructions or program code executable by the at least one processor. In some implementations, the at least one processor may be configured to execute computer program code stored in the memory to cause the management server 122 to perform operations related to managing operation of ESL devices 108A-108D, an access point (AP) 106A, an access point (AP) 106B, the gateway node 120, and/or other components within the ESL system 100. For example, the management server 122 may perform operations relating to the iterative positioning of ESL devices within the retail environment 110, as will be described in further detail below.

The gateway node 120 may communicate with access points (APs) 106A and 106B. Although two APs are shown in the example of FIG. 1B, fewer or more APs may be included in the ESL system 100. The APs 106A and 106B may communicate through a first communication network, either wired or wireless, with the gateway node 120. The APs 106A and 106B may also communicate through a second communication network with the ESL devices 108A-108D. In some embodiments, the first and second communication networks may be different networks. For example, the first communication network (e.g., between the AP 106A and the gateway node 120) may be a Wi-Fi network, and the second communication network (e.g., between the AP 106A and the ESL device 108A) may be a Bluetooth network.

In some embodiments, each of the APs 106A and 106B may communicate with a subset of the ESL devices 108A-108D located in a geographic area assigned to that AP, e.g., based on a location of the AP relative to each ESL device and/or a signal coverage area of the AP. For example, the retail environment 110 may be divided into two geographic areas that each cover approximately half of the total area of the retail environment 110. The AP 106A may be assigned to a geographic area 110A, and the AP 106B may be assigned to a geographic area 110B. Accordingly, the AP 106A may communicate with ESL device 108A and ESL device 108B located in the geographic area 110A, and the AP 106B may communicate with ESL device 108C and ESL device 108D located in the geographic area 110B.

As described above, the ESL devices 108A-108D may communicate with their respective APs 106A and 106B via a Bluetooth network. Bluetooth technology generally provides a secure way to connect and exchange information between electronic devices, such as smartphones, other cellular phones, headphones, earbuds, smartwatches, laptops, wearables, and/or shelf labels. Bluetooth communications may include establishing wireless personal area networks (PANs) (also referred to as "ad hoc" or "peer-to-peer" networks). These ad hoc networks are commonly called "piconets." For example, the ESL devices 108A and 108B may be in a first piconet with the AP 106A while the ESL devices 108C and 108D may be in a second piconet with the AP 106B. It should be appreciated, however, that each ESL device may belong to multiple piconets in some implementations. Multiple interconnected piconets may be called scatternets. A scatternet may be formed when a member of the first piconet elects to participate in the second piconet.

Because many of the services offered over Bluetooth can expose private data or allow the connecting party to control the connected device, Bluetooth networks may have devices first establish a "trust relationship" before they are allowed to communicate private data to one another. This trust relationship may be established using a process referred to as "pairing," in which a bond is formed between two devices. This bond enables the devices to communicate with each other in the future without further authentication. Thus, the ESL device 108A in FIG. 1B may be bonded in such a manner to the AP 106A. The pairing process may be triggered automatically each time the device is powered on or moved within a certain distance of another Bluetooth device. Pairing information relating to current and previously established pairings may be stored in a paired device list (PDL) in the memory of the Bluetooth device, such as the ESL device 108A and/or the AP 106A. This pairing information may include a name field, an address field, a link key field, and other similar fields (such as "profile" type) useful for authenticating the device or establishing a Bluetooth communication link. The pairing information may allow the ESL device 108A to reconnect to the AP 106A automatically when, for example, power loss causes the ESL system 100 to reset.

A Bluetooth "profile" describes general behaviors through which Bluetooth-enabled devices communicate with other Bluetooth devices. For example, the hands free profile (HFP) describes how a Bluetooth device (such as a smartphone) may place and receive calls for another Bluetooth device, and the Advanced Audio Distribution Profile (A2DP) describes how stereo-quality audio may be streamed from a first Bluetooth device (such as a smartphone) to another Bluetooth device (such as an earbud). The ESL devices 108A-108D may be configured with an ESL Profile compliant with the Electronic Shelf Label Profile Specification v1.0 dated Mar. 28, 2023, which is incorporated by reference herein. The ESL Profile may specify how the AP 106A may use one or more ESL Services exposed by the ESL device 108A.

In some embodiments, the management server 122 may be part of an Enterprise Resource Planning (ERP) system for managing inventory (e.g., products) and other assets (the ESL devices 108A-108D and other components of the ESL system 100) in the retail environment 110. The management server 122 may be, for example, a database server that stores and manages a variety of information used in the operation of a retail store or distribution warehouse. Such information may include product information regarding products displayed in the store as well as the location and other relevant information associated with each component of the ESL system 100 (including each of the ESL devices 108A-108D and the APs 106A and 106B). In some implementations, the information may be stored in a separate inventory management database of the ERP system that is accessible to the management server 122 via a wired or wireless network.

The management server 122 may generate and transmit command messages to the ESL devices 108A-108D via the first communication network described above. The command messages may be used by the management server 122 to carry out various functions in the ESL system 100, such as the synchronization, updating, and alteration of product information displayed on the ESL devices 108A-108D. The management server 122 may obtain the product information from a product database provided for the ESL devices 108A-108D. That is, the management server 122 may be provided with a database that stores identification information relating to the ESL devices 108A-108D in connection with product information to be displayed on a corresponding one of the ESL devices 108A-108D.

A command message created by the management server 122 (e.g., a product-information change message or a management-information acquisition message) can be transferred to the gateway node 120 using a communication scheme supported by the gateway node 120. The command message may be converted into a packet configured according to the communication scheme and the configured packet may be transferred to the gateway node 120. Furthermore, the management server 122 may receive a reception acknowledgement message sent from the gateway node 120 using the communication scheme. In some cases, the acknowledgement message may be first converted into a message format suitable for reception by the management server 122 before being transferred by the gateway node 120.

In some embodiments, the command messages transmitted by the management server 122 via the gateway node 120 may include various commands for configuring or controlling different components of the ESL system 100 as part of an iterative positioning process for estimating or determining a position of a target device, e.g., the BLE device 124, within the environment 110. As will be described in further detail below with respect to FIGS. 5A-8, the position of the target device may be determined based, at least in part, on a known topology of the ESL devices 108A-108D and other ESL devices (or "ESLs 108" collectively) of the ESL system 100 deployed in a vicinity of the target device within the environment 110. Accordingly, the commands transmitted by the management server 122 may include, but are not limited to, commands directing the BLE device 124 and/or a subset of the ESL devices (including one or more of the ESL devices 108A-108D) determined to be in a vicinity of the BLE device 124 to collect and report positioning measurements of beacon signals exchanged between the ESL devices and the BLE device 124. The positioning measurements may then be used by the management server 122 to determine a position of the BLE device 124 as part of the iterative positioning techniques disclosed herein.

Although only one gateway node 120 is shown in FIG. 1B, the ESL system 100 may include several such gateway nodes communicating with the management server 122. Each gateway node 120 analyzes data received from the management server 122, confirms the presence or absence of a message or data to be sent to one or more of the ESL devices 108A-108D, and then sends the confirmed message or data to the appropriate ESL device. For example, the gateway node 120 may configure a message, which is to be sent to the ESL device 108A, into a packet according to a communication scheme and send the configured packet to the ESL device 108A through commanding the AP 106A to transmit the packet. Furthermore, the gateway node 120 may transfer a reception acknowledgement message received from the ESL device 108A through the AP 106A to the management server 122.

Figure 1C:
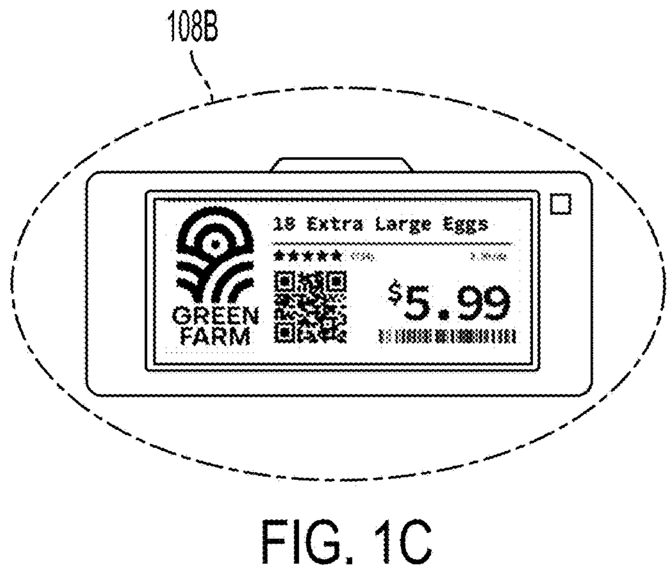
FIG. 1C is a diagram illustrating an example ESL device in the ESL system of FIGS. 1A and 1B according to some embodiments of this disclosure.

Each of the ESL devices 108A-108D may include a display, such as a Liquid Crystal Display (LCD), for displaying data concerning products located on a shelf to which the corresponding ESL device is attached. The information displayed by each of the ESL devices 108A-108D may be received from the gateway node 120. The ESL devices 108A-108D may change price information or be activated or inactivated while communicating with the gateway node 120. A store manager may send the management server 122 a command concerning the synchronization between a product and a specified ESL device and/or a command for the correction of information regarding a product assigned to the particular ESL device. An example of the ESL device 108B is shown FIG. 1C with a display device for displaying product information, such as a product description, a product image, a product price, a product barcode, a product rating, a product Stock Keeping Unit (SKU), and/or a product link (e.g., a URL or QR code).

Each of the ESL device 108A-108D may be configured with a microcontroller including a memory and a microprocessor for performing various operations. An example of such an ESL device configuration will be described in further detail below with reference to FIG. 4.

In some embodiments, visual information obtained from the shelf cameras 104A-104D and/or the OTT cameras 102 may be used to augment the indoor positioning capabilities of the ESL system 100. As described above, cameras may be installed on or near the shelves at the ends of the gondolas 112A-112H to capture different views of the aisles between the gondolas 112A-112H and/or other pathways in the areas surrounding the gondolas 112A-112H. For example, shelf cameras 104A-104D may be positioned with a field of view capturing one or more shelves of one or more of the gondolas 112A-112H. The shelf cameras 104A-104D may be used to assist in tracking stock levels and/or identifying items picked by users while in the environment. Also, as described above, OTT cameras 102A-102D may be positioned with a field of view capturing large areas of the retail environment 110. The visual information (e.g., images and/or video) captured by the OTT cameras 102A-102D and the shelf cameras 104A-104D may be transmitted to the management server 122 for processing.

In some implementations, the management server 122 may apply object recognition models or systems to the image frames received from the OTT cameras 102A-102D and/or shelf cameras 104A-104D to determine a presence of, or count of, people and objects (including products and ESL devices on shelves) located in the field of view of a respective camera. For example, the OTT cameras 102A-102D and/or shelf cameras 104A-D may be used to support the determination of the positions of the ESL devices 108A-108D, the BLE device 124, and/or other devices within the retail environment 110.

Figure 2A:
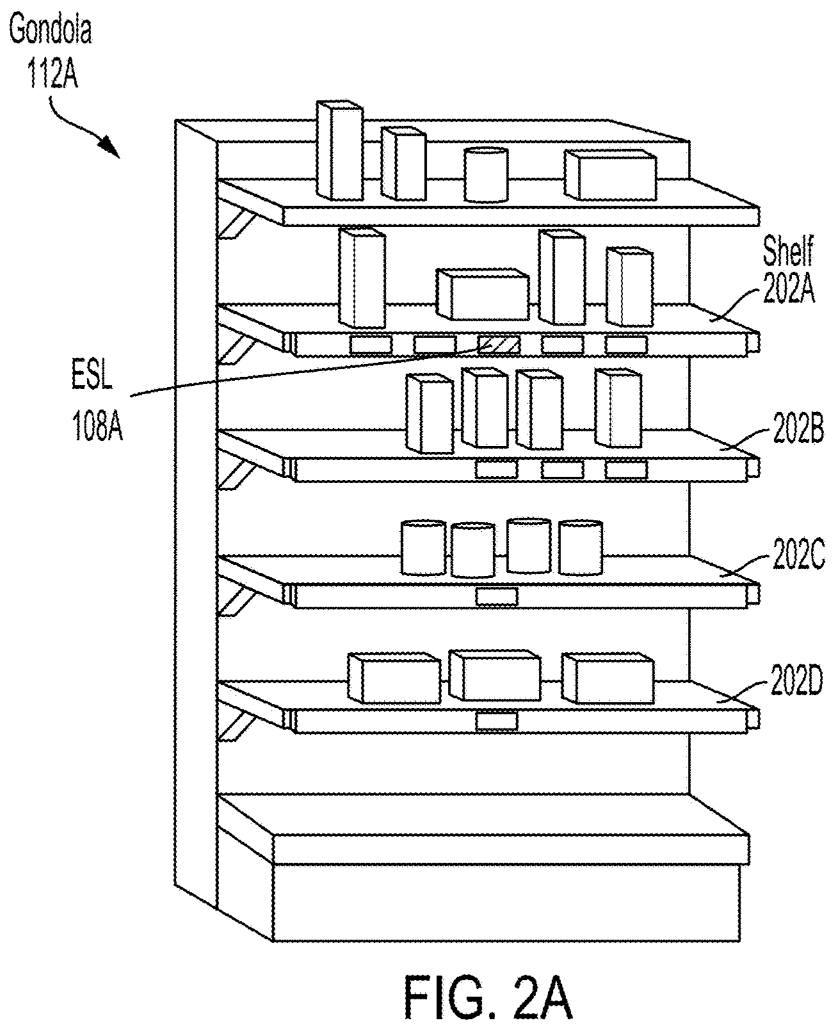
FIG. 2A is a perspective view of a gondola including multiple shelves with ESL devices according to some embodiments of this disclosure.

As described above, the retail environment 110 associated with the ESL system 100 may include ESL devices organized on gondolas and shelves. One example of such a gondola is shown in FIG. 2A. FIG. 2A is a perspective view of gondola 112A with ESL devices according to some embodiments of the disclosure. The gondola 112A may include multiple shelves 202A-202D at different vertical levels from a floor. ESL devices may be attached to the shelves 202A-202D. For example, ESL device 108A may be attached to shelf 202A to display information regarding products stocked on shelf 202A in the vicinity of the ESL device 108A.

Figure 2B:
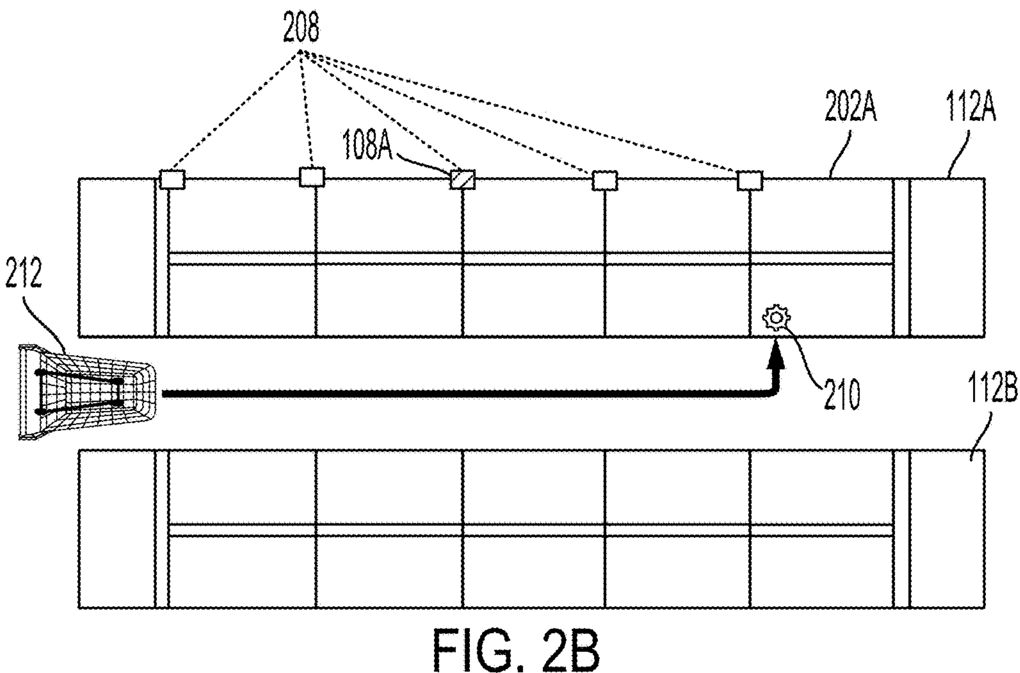
FIG. 2B is a top-down view of an aisle between different gondolas with ESL devices accessible to a user within a retail environment according to some embodiments of this disclosure.

The ESL devices may provide information to a shopper or store employee operating in the environment, such as to provide information regarding products and/or assist with location determination of products or the user. FIG. 2B is a top-down view of an aisle between gondolas 112A and 112B with ESL devices on the shelves of each gondola accessible to a user according to some embodiments of the disclosure. As shown in FIG. 2B, gondola 112A may include a dense deployment of ESL devices 208 (including the ESL device 108A) with adjacent ESL devices uniformly spaced along shelf 202A. Additional ESL devices may be similarly positioned along other shelves of gondola 112A and the shelves of gondola 112B. A user pushing a shopping cart 212 through the aisle may use ESL devices 208 to determine the location of a particular product. For example, a mobile device associated with the shopping cart 212 may use RF measurements of radio signals broadcasted by the ESL devices 208 (and/or other ESL devices located nearby) to estimate a current location of the user (and shopping cart 212) within the environment and guide the user to a location 210 of a desired product on the appropriate shelf of gondola 112A.

Figure 3:
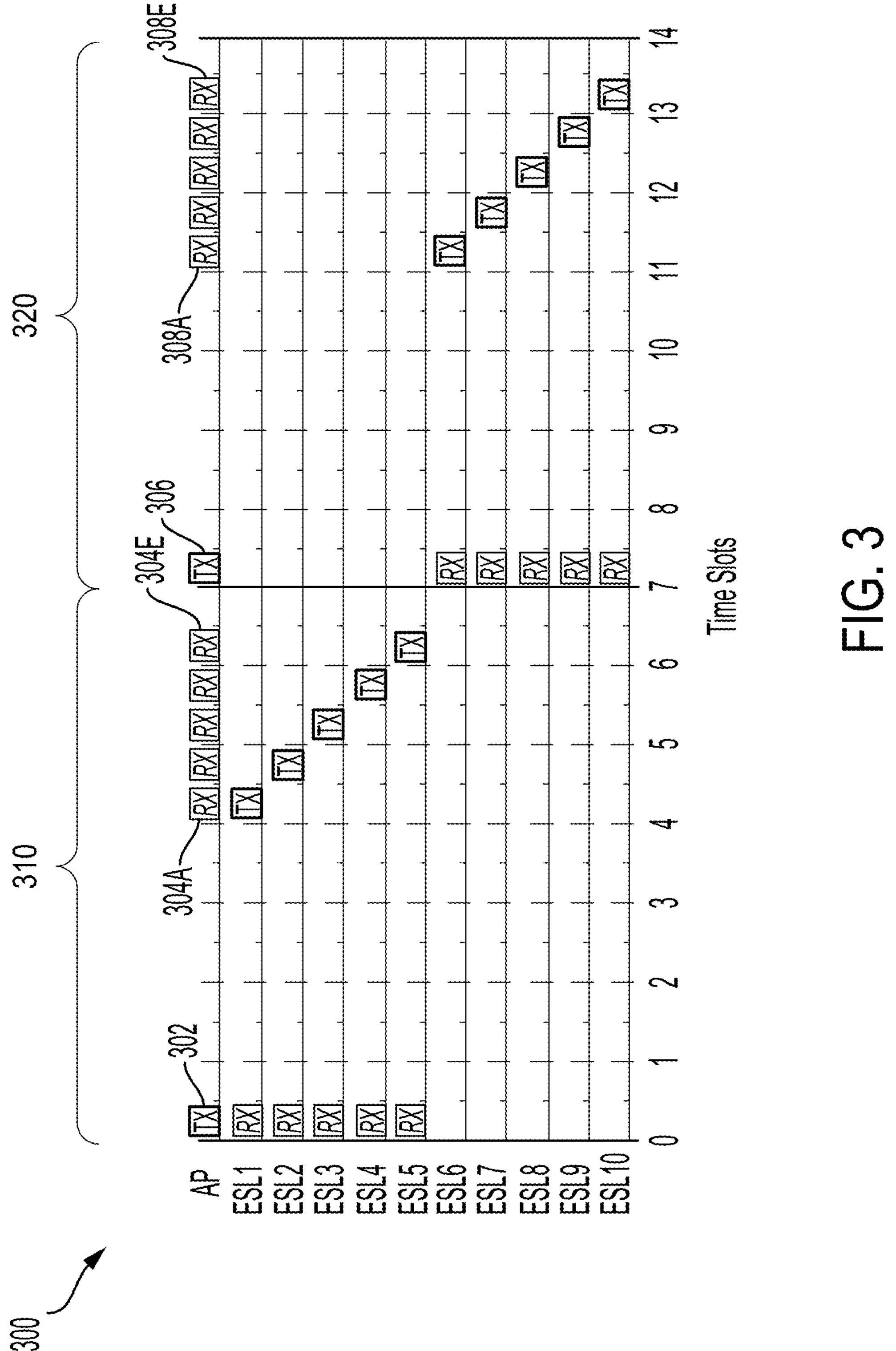
FIG. 3 is a timing diagram illustrating a time division multiplexing scheme for scheduling communications between different nodes of an ESL system according to some embodiments of this disclosure.

Communication between different nodes, such as an AP (e.g., AP 106A), ESL devices (e.g., ESL devices 108A-108D), and gateway nodes (e.g., gateway node 120), of an ESL system (e.g., ESL system 100 of FIGS. 1A and 1B) may be performed according to a Time Division Multiple Access (TDMA) scheme, as illustrated in FIG. 3. FIG. 3 is a timing diagram illustrating a time division multiplexing scheme 300 for communications between different nodes (e.g., an AP and different ESL devices) of an ESL system according to some embodiments of the disclosure. As shown in FIG. 3, an AP and each ESL device of the ESL system may be allocated one of various time periods corresponding to different time slots for transmitting or receiving information. It should be appreciated that a similar TDMA scheme may be used for communications between different ESL devices or between the ESL devices and a target device (e.g., BLE device 124 of FIGS. 1A and 1B, as described above).

In ESL systems with significant numbers of ESL devices, the ESL devices may be configured to communicate with the AP in different groups or subsets, where each group/subset of ESLs may correspond to a different time frame. For example, a first group of ESL devices (ESL1-ESL5) in FIG. 3 may be configured to communicate with the AP during a first time frame 310, and a second group of ESL devices (ESL6-ESL10) may be configured to communicate with the AP during a second time frame 320. The first and second time frames 310 and 320 may alternate during operation of the wireless network. The AP in this example may transmit or broadcast information that is received by the first group of ESL devices during a first time period (or time slot) 302 in the first time frame 310. The ESL devices in this first group may transmit information to the AP during subsequent time periods/slots in the time frame 310. For example, the first ESL device (ESL1) may transmit information received by the AP during a time period 304A, with the other ESL devices (ESL2-ESL5) in this group transmitting during time periods 304B-304E, respectively, in the time frame 310. Likewise, the AP may transmit information received by the second group of ESL devices during a time period 306 in the second time frame 320. The ESL devices (ESL6-ESL10) in this second group may transmit information received by the AP during respective time periods 308A-308E in the time frame 320.

Figure 4:
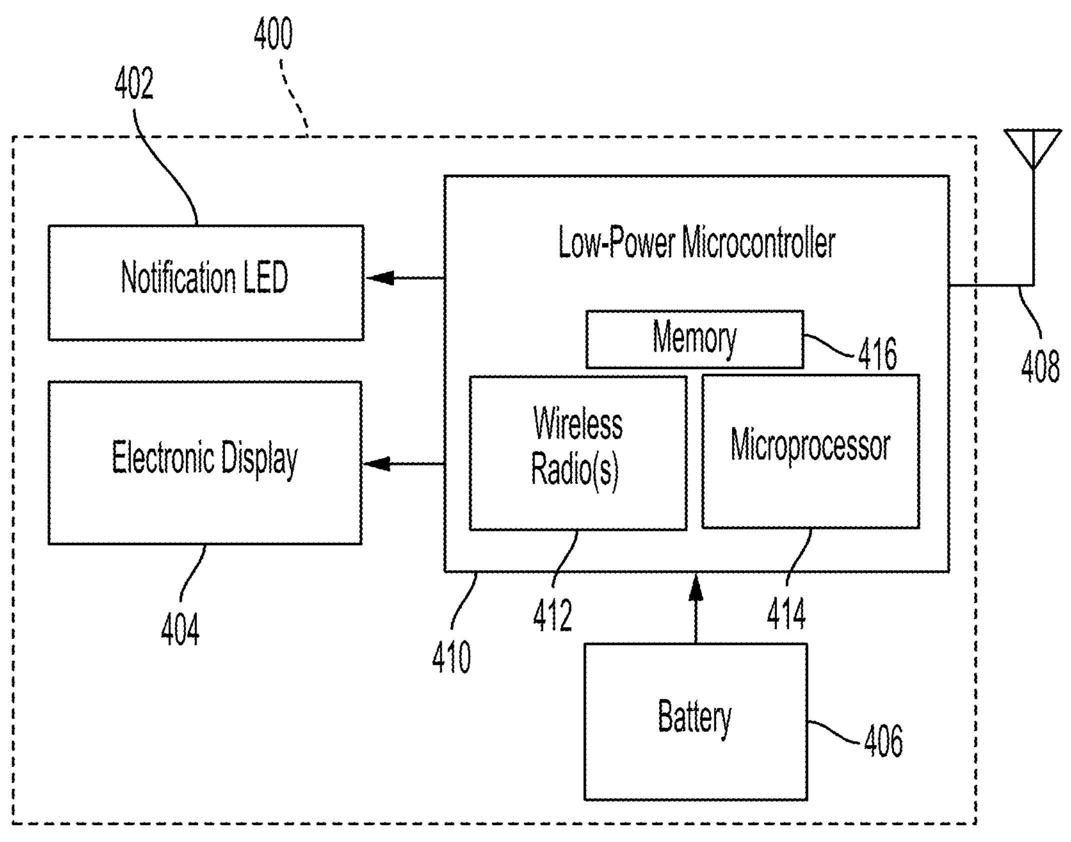
FIG. 4 is a block diagram illustrating an example of an ESL device according to some embodiments of this disclosure.

An ESL device may include components configured together to provide some or all of the functionality described in this disclosure and/or provide additional functionality. FIG. 4 is a block diagram illustrating an example ESL device 400 according to some embodiments of this disclosure. For example, the ESL device 400 may be used to implement each of the ESL devices (including the ESL devices 108A-108D and other ESL devices or "ESLs 108" collectively) of the ESL system 100 described above with respect to FIGS. 1A-2B. The ESL device 400 may include a low-power microcontroller 410. Although functionality for the ESL device may be configured by the microcontroller 410 in embodiments of this disclosure, any single or combination of processors (e.g., at least one processor) may be used to perform the functions described according to embodiments of this disclosure.

The microcontroller 410 may include a memory 416. The memory 416 may store computer program code that causes a microprocessor 414 to execute operations that carry out some or all of the functionality described with respect to various embodiments of this disclosure. Although shown as part of the microcontroller 410, the memory 416 may be located internal to or external to the microcontroller 410. The microcontroller 410 may also include one or more wireless radio(s) 412. The wireless radio(s) 412 may include, for example, a Bluetooth wireless radio including a front end that couples to an antenna 408 for transmitting and receiving radio frequency (RF) signals at one or more frequencies in one or more frequency bands. In some embodiments, the microcontroller 410 is a System on Chip (SoC) in which two or more components of the wireless radio(s) 412, the microprocessor 414, and/or the memory 416 are included in a single semiconductor package. In some embodiments, the two or more components may be included on a single semiconductor die.

The ESL device 400 may include I/O devices, such as a notification LED 402 and/or an electronic display 404. The notification LED 402 may include one or more light emitting diodes (LEDs), or other light sources configured to flashlight of one or more colors. The notification LED may be triggered to blink at a specific time and/or with a specific color based on a command received from the gateway node 120. For example, a notification LED 402 may blink to attract a user's attention to a particular location on a shelf. The electronic display 404 may be, for example, an electronic-ink (e-ink) display configured to output the product information.

The ESL device 400 may couple to a battery 406 or other power source to power operations performed by the ESL device 400, such as to operate the wireless radio(s) 412, the notification LED 402, the electronic display 404, the memory 416, and/or the microprocessor 414. The battery 406 may allow placement of the ESL device 400 in a place where constant power supply is difficult. Thus, in order that a single battery charge provides a long period of use (e.g., lasting longer than several years), the ESL device 108 may be configured to reduce power consumption during times when frequent commands are not expected. For example, the ESL device 400 may operate using a wakeup communication scheme. That is, the ESL device 400 wakes up according to predetermined time intervals to determine whether data is waiting to be received. When no data is waiting, power to the ESL device 400 is turned off until the next wakeup period to reduce power consumption. When there is data to be received, the ESL device 400 wakes up to perform communication operations. In some embodiments, the ESL device 400 may wake up in response to receiving a command message from an AP (e.g., AP 108A of FIG. 1B, as described above) or a management server (e.g., management server 122 of FIG. 1B) of the ESL system via a gateway node (e.g., gateway node 120).

As described above, the command messages transmitted by the management server may include commands for configuring the ESL devices or nodes ("ESLs") to collect and report positioning measurements for a target device (e.g., the BLE device 124 of FIG. 1B) as part of an iterative positioning process to determine a position of the target device relative to a known topology of the ESLs deployed within the environment. For example, a first iteration of the process may produce an initial estimate of the target device's position (e.g., a coarse location) based on RF measurements (e.g., RSSIs) of positioning signals received (on the uplink) from the target device by ESLs deployed across multiple aisles in an area of the environment where the target device is generally located. As will be described in further detail below with reference to FIGS. 5A-8, the initial position estimate or coarse location of the target device may then be refined over one or more subsequent iterations of the positioning process using positioning measurements from relatively smaller subsets of the ESLs selected at each iteration, e.g., until a desired level of granularity or ESL sub-selection (e.g., at the gondola-level or shelf-level) is reached or a positioning error associated with the target device's position is less than a maximum positioning error tolerance. The management server in this example may generate and transmit command messages to configure the subset of ESLs selected at each iteration of the process to collect and report the corresponding positioning measurements for the target device.

It is assumed for purposes of this disclosure that the positioning measurements are collected and reported to the server by ESLs in a vicinity of the target device based on signal transmissions received by the ESLs on the uplink from the target device. However, in other implementations, the ESLs may transmit positioning signals, which are received and measured by the target device on the downlink. The positioning measurements in this case may then be relayed by the target device to the server.

In some embodiments, the ESLs may be deployed within the environment according to a standardized topology in which adjacent ESLs are uniformly spaced horizontally on the same shelf and vertically across different shelves of each gondola. For example, the ESLs may be positioned along their respective shelves according to a uniform horizontal spacing between adjacent ESLs on the same shelf and a uniform vertical spacing between adjacent ESLs across different shelves. This topology information may be used to resolve ambiguities and perform corrections. This information may also enable positioning estimation errors or inaccuracies to be interpreted as part of a matching problem, where a best-fit approach (that can be solved using numerical computations) may be found given the known topology (including horizontal and vertical geometries) of the ESLs in a vicinity of a target device. An example of such a topology is shown in FIG. 5A.

FIG. 5A is a diagram illustrating an example topology 500A of ESLs deployed across multiple aisles according to some embodiments of this disclosure. As shown in FIG. 5A, the ESLs in the topology 500A may be arranged uniformly along different shelves of gondolas 510, 520, 530, and 540. Each of the gondolas 510, 520, 530, and 540 may include at least four shelves. Certain gondolas, such as each of gondolas 520 and 530, may include four shelves on either side of the gondola for a total of eight shelves. Each shelf of the gondolas 510, 520, 530, and 540 may include a total of 12 evenly spaced ESLs. However, it should be appreciated that the disclosed iterative positioning techniques are not intended to be limited thereto and that these techniques may be applied to any topology including any number of ESLs deployed across any number of gondolas having any number of shelves.

In some embodiments, positioning measurements obtained from the ESLs on one or more of the gondolas may be used to determine the position of a target device 502 (e.g., the BLE device 124 of FIG. 1B, as described above). The positioning measurements may include, for example, RSSIs of positioning signals received by the ESLs from the target device 502 as it (and a user of the device) moves through different aisles between the gondolas. The different aisles may include an aisle 515A between the gondolas 510 and 520, an aisle 525A between the gondolas 520 and 530, and an aisle 535A between the gondolas 530 and 540. The positioning measurements obtained for the target device 502 may be used to estimate different positions of the target device 502 within each aisle.

Figure 5B:
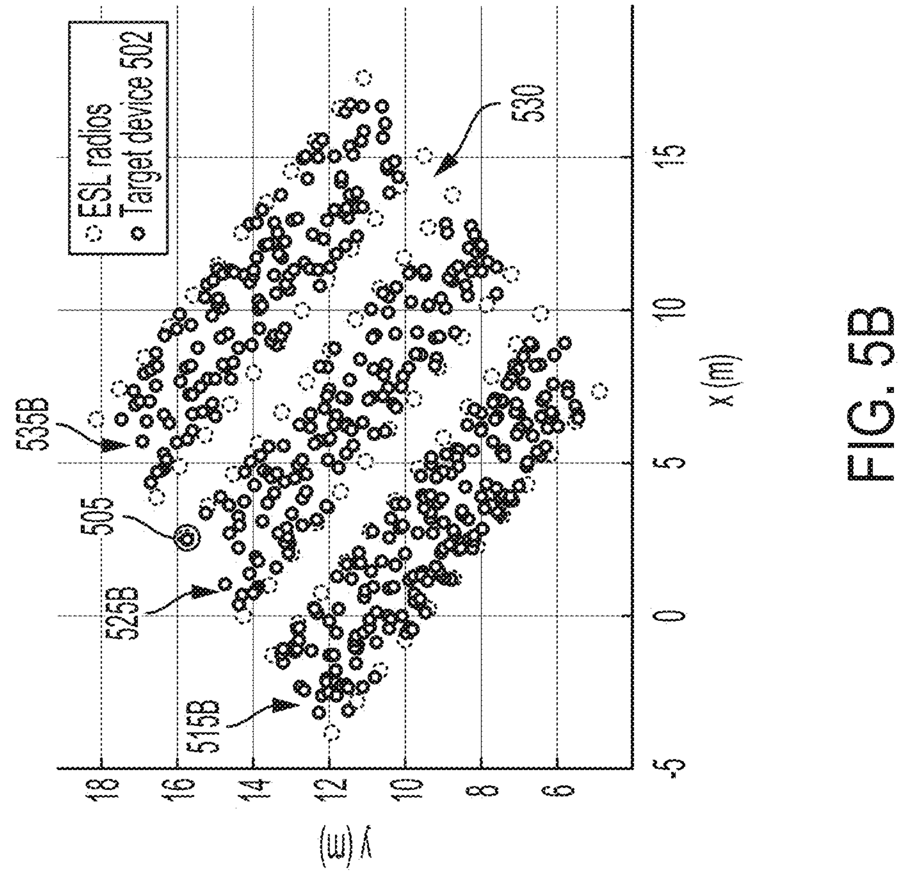
FIG. 5B is a diagram illustrating example positions of a target device relative to a top-down view of the topology of ESL devices in FIG. 5A according to some embodiments of this disclosure.
Figure 5B:
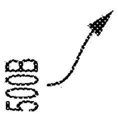

It is assumed for purposes of the example shown in FIG. 5A that a current position of the target device 502 corresponds to the aisle 525A between the gondolas 520 and 530. However, given the dense deployment of ESLs within this environment, the position of the target device 502 may get skewed due to overlapping positioning measurements from ESLs located in other aisles adjacent to the aisle 525A. For example, the positioning measurements (e.g., RSSIs) obtained from ESLs in the aisle 515A and/or the aisle 535A may be relatively stronger than the measurements from ESLs in the same aisle 525A as the current position of the target device 502. As a result, the positioning measurements may cause the target device 502 to be incorrectly positioned in the wrong aisle. In some cases, such overlapping measurements may produce other erroneous position estimates for the target device 502, as illustrated in FIG. 5B.

FIG. 5B is a diagram illustrating example positions of the target device 502 relative to a top-down view 500B of the topology 500A of the ESLs in FIG. 5A according to some embodiments of this disclosure. As shown in FIG. 5B, the different positions of the target device 502 may correspond to areas 515B, 525B, and 535B of the top-down view 500B. The positions of the target device 502 in areas 515B, 525B, and 535B largely correspond to the aisles 515A, 525A, and 535A, respectively, of FIG. 1A. However, overlapping positioning measurements from ESLs located in adjacent aisles may produce position estimates for the target device 502 at certain points of the positioning process that are erroneous. For example, the estimated position of the target device 502 at a point 505 within the area 525B corresponding to aisle 525A of FIG. 1A may coincide with the location of an ESL on a shelf of the gondola 530.

To improve positioning accuracy in such environments, the disclosed iterative positioning techniques may use the known topology of ESLs together with one or more selection criteria to constrain the ESLs to those located closest to the target device 502 over successive iterations of the positioning process. As described above, initial positioning measurements received for the target device 502 during a first iteration of the positioning process may be used to estimate or determine a first position of the device within the environment. The initial measurements may be based on positioning signals exchanged between the target device and various ESLs (e.g., all ESLs) deployed across the multiple aisles 515A, 525A, and 535A of FIG. 5A. The first position may be an initial coarse location of the target device 502 that corresponds to an area of the environment in which these aisles and gondolas are located. The first position (or coarse location) of the target device 502 may be based on, for example, a weighted average of the corresponding ESL positions in this area. Based on the first position of the target device 502 and the known topology 500A of the ESLs, a first subset of the ESLs may be identified. The first subset may include, for example, the ESLs that are located in the same aisle as the target device 502 (e.g., aisle 525A). To further improve positioning accuracy, a smaller subset of the ESLs closer to the target device may be selected. As will be described in further detail below with reference to FIGS. 6 and 7, constraining the ESLs (and corresponding positioning measurements therefrom) to those located closer to the target device (e.g., within same aisle) improves the accuracy of the positioning measurements and overall positioning performance as a result. For example, selecting ESLs that are physically located closer to the target device will likely form a more favorable geometry with less geometric dilution of precision (GDOP) and a better signal-to-noise ratio (SNR).

Figure 6:
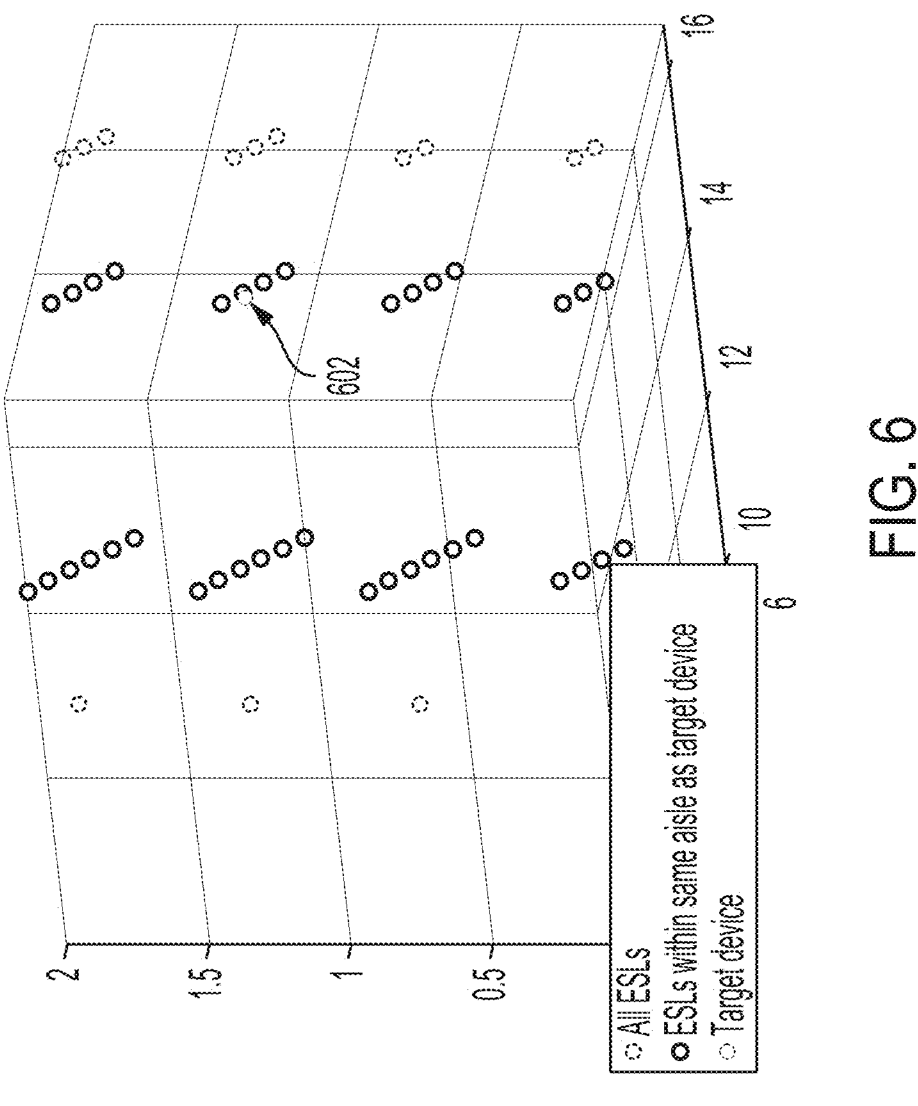
FIG. 6 is a diagram illustrating an example topology including different subsets of ESL devices in a vicinity of a target device according to some embodiments of this disclosure.

FIG. 6 is a diagram illustrating an example topology 600 including different subsets of ESLs in a vicinity of a target device 602 according to some embodiments of this disclosure. As shown in FIG. 6, a first subset of ESLs may include all ESLs devices located across multiple aisles corresponding to an area in which the target device 602 is generally located. As described above, positioning the target device 602 using positioning measurements from the first subset may produce erroneous results. To improve positioning accuracy, a second, smaller subset of ESLs located closer to the actual position of the target device 602 (e.g., ESLs within the same aisle) may be selected based on the known topology of the ESLs.

Also, increasing the number of measurements obtained from the second subset of ESLs (within the same aisle) may improve positioning accuracy even further. For example, positioning a target device using a single measurement from only the ESLs located within the same aisle as the target device has less positioning error than using a single measurement from all ESLs deployed across multiple aisles (e.g., the first subset of ESLs in FIG. 6, as described above). Furthermore, increasing the number of measurements or number of iterations in which measurements are obtained (e.g., from one to four) further reduces the positioning error. Thus, positioning accuracy may be improved (e.g., by 10%) by increasing the number of measurements (or number of iterations) and the level of granularity or ESL sub-selection (e.g., going from all ESLs to ESLs within the same aisle). Further accuracy improvements may be attained at finer levels of granularity (e.g., ESL sub-selection at the gondola level or the shelf level).

In some embodiments, a model may be used to represent the topology of ESLs in a vicinity of the target device. Such a model may indicate any number of details regarding the known infrastructure or layout of the ESLs deployed in a vicinity of the target device (or currently estimated position thereof). Such details may include, for example and without limitation, the number of aisles, the number of gondolas associated with each aisle, the number of shelves on each gondola, the number of the ESLs on each shelf, and the horizontal and vertical layout of the ESLs across one or more shelves. The model may be used to identify multiple rows of ESLs (on one or more gondolas) in the same aisle as the target device, e.g., as shown for the target device 602 in FIG. 6 described above. Furthermore, a subset of the ESLs corresponding to one or more of the rows may be identified based on one or more selection criteria. As described above, the selection criteria may include, for example, a minimum RSSI criterion and a maximum number criterion. The minimum RSSI criterion may specify a minimum RSSI threshold for ESLs in to be selected such that only ESLs with the strongest RSSIs are selected. The maximum number criterion may specify a maximum limit the quantity of identified/selected ESLs to some maximum number. The values of the minimum RSSI threshold and maximum number may be set as desired for a particular implementation. Accordingly, using the model described above, one or more rows of ESLs that produce the strongest RSSIs may be selected based on an average RSSI of the ESLs across each of the rows. Similarly, a gondola and/or a shelf of the gondola having ESLs with the strongest RSSIs may be identified along similar lines.

In some implementations, one or more of the selection criteria may correspond to hyperparameters of the model. Such hyperparameters may include, for example, a number (N) corresponding to the number of strongest ESLs (or ESLs with the strongest RSSIs) to be selected in a vicinity of the target device and a ranking metric or priority factor (λ) that translates into weights for each of the selected ESLs based on a strength of the associated RSSI values (where ESLs with stronger RSSIs are assigned relatively greater weights). The position ($\hat{P}$) of the target device may be determined using such hyperparameters of the model as a weighted average of the ESL positions, where the weights are a function of the RSSI values, e.g., as expressed by Equations (1) and (2):

$$\hat{P} = \frac{\sum_{k=1}^{N} w_k \cdot P_k}{\sum_{k=1}^{N} w_k} \tag{1}$$

-continued $$w_k = 2^{\frac{r_k - r_1}{\lambda}}, \tag{2}$$

where $r_1 \geq r_2 \geq \ldots r_M$ denote the RSSI values for M ESLs (in descending order) and both N and λ may be empirical terms that may be preset to appropriate values as desired for a particular implementation.

In some embodiments, a unique set of hyperparameters may be used for each level of ESL sub-selection (or each subset of ESLs selected at each iteration) of the positioning process. For example, a first set of hyperparameters (N=30, λ=3.1) may be used to estimate a first position of the target device for a first iteration of the process based on measurements of all available ESLs (e.g., ESLs across multiple aisles), a second set of hyperparameters (N=20, λ=2.4) may be used to estimate a second position of the target device for a second iteration of the process based on measurements of a subset of the ESLs (e.g., ESLs corresponding to the same aisle), and a third set of hyperparameters (N=10, λ=2.1) may be used to estimate a third position of the target device for a third iteration of the process based on measurements of a smaller subset of the ESLs (e.g., ESLs on the same gondola).

As an alternative to using the model, each of the ESLs may broadcast one or more location identifiers for a location of the corresponding ESL relative to the known topology. Such identifiers may be received by a server of the ESL system (e.g., management server 122 of FIG. 1B) along with the positioning measurements from each ESL. The location identifiers may include, for example, one or more of an aisle identifier (ID), a gondola ID, and a shelf ID. In some implementations, the identifiers may be entered for each ESL by a user (such as a store worker) into an ERP inventory management system during the initial installation or deployment of the ESLs within the environment, as described above. One or more of the location identifiers may be used by the server during each iteration of the positioning process to identify a subset of the ESLs in a vicinity of the target device and trigger the identified ESLs to listen for and/or receive positioning signals transmitted by the target device.

In addition to the known topology of the ESLs, a subset of the ESLs for further positioning of a target device may be identified or selected based on a current or previous position of the target device (e.g., as determined during a previous iteration of the positioning process) and/or other relevant information that may be available for determining or updating the position of the target device at each iteration of the process. Such information may include, for example, visual data, such as images and/or video captured by one or more cameras (e.g., OTT cameras 102A-102D and/or shelf cameras 104A-104D of FIG. 1B, as described above) installed within the environment. Such information may also include, for example, other RF positioning data from an RFID scanner or Wi-Fi access point that can be used to identify an aisle or other area in which a subset of ESLs located closest to the target device (e.g., ESLs on the closest gondola or closest shelf) may be identified or selected. This information along with positioning measurements obtained from the identified subset of ESLs may be used to further refine the position of the target device at each iteration. As described above, the positioning process may be performed over any number of iterations until, for example, a desired level of granularity or ESL sub-selection (e.g., at the gondola-level or shelf-level) is reached or until an associated positioning error falls below a maximum positioning error tolerance.

Figure 7:
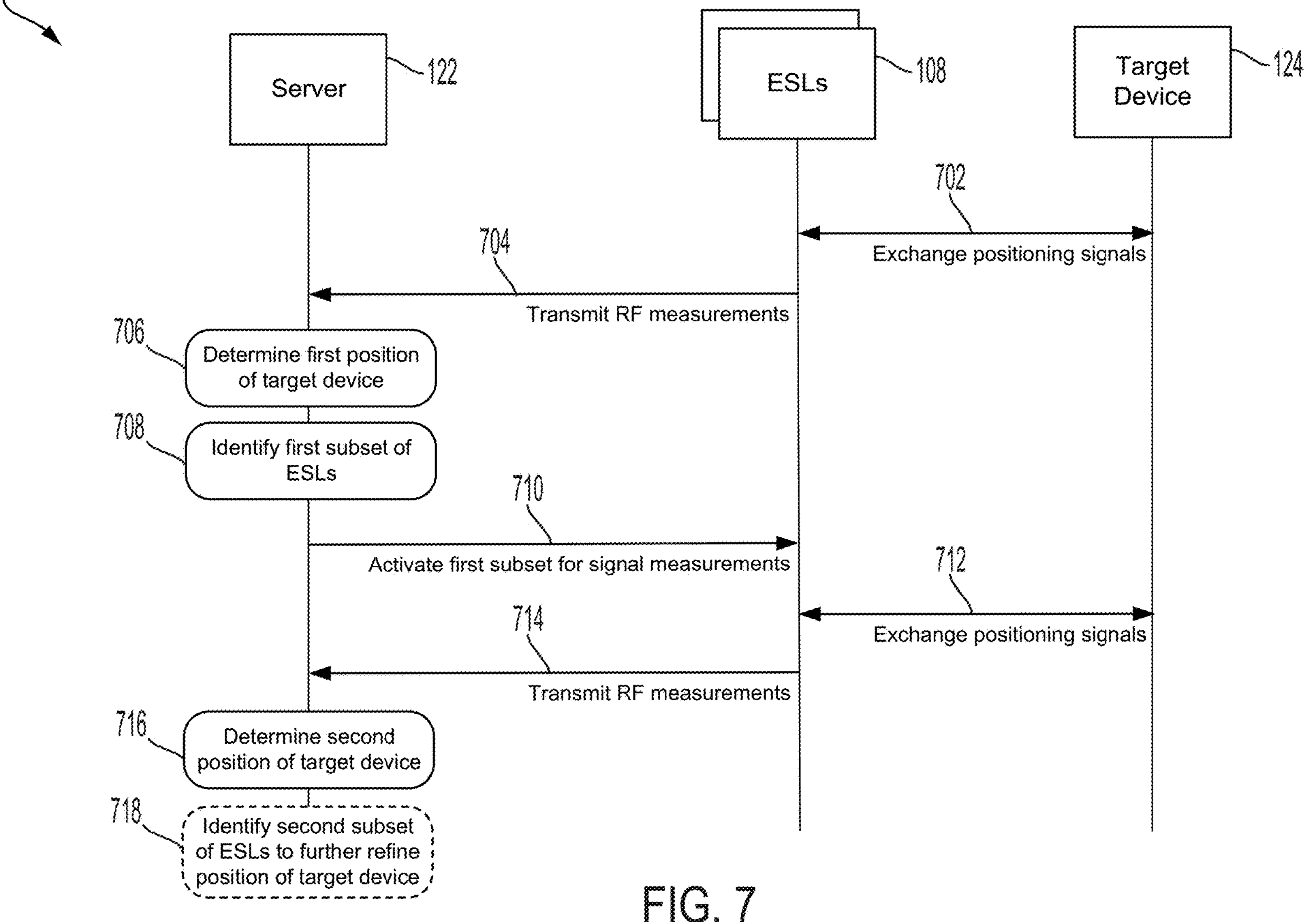
FIG. 7 is a signaling diagram illustrating an example communication flow between different components of an ESL system during an iterative positioning process for determining a position of a target device within an indoor environment according to some embodiments of this disclosure.

In some embodiments, each iteration of the positioning process may be performed by a server of the ESL system (e.g., the management server 122 of FIG. 1B), as will be described in further detail below with respect to FIG. 7. FIG. 7 is a signaling diagram illustrating an example communication flow 700 between different components of an ESL system (e.g., ESL system 100 of FIG. 1B, as described above) during an iterative positioning process for determining a position of a target device based on a known topology of ESLs deployed within an environment according to some embodiments of this disclosure. For discussion purposes, the communication flow 700 will be described using components of the ESL system 100 of FIG. 1B, as described above, but the communication flow 700 is not intended to be limited thereto.

As shown in FIG. 7, the communication flow 700 begins with positioning measurements and reporting. At step 702, in which ESLs 108 exchange positioning signals with a target device 124. Step 702 may include, for example, the ESLs 108 measuring positioning signals received (on the uplink) from the target device 124. In other implementations, the target device 124 can measure positioning signals received (on the downlink) from the ESLs 108. The ESLs 108 may include, for example, multiple ESLs (e.g., in the order of 50-100) deployed across multiple aisles and gondolas, as described above. At step 704, the ESLs 108 may transfer RF measurements (e.g., RSSIs) to the server 122 based on the positioning signals received from the target device 124.

Then, the server 122 may make determinations using the reported positioning measurements. At step 706, the server 122 may determine a first position of the target device 124 based on the RF measurements received at step 704. At step 708, the server 122 may identify a first subset of the ESLs 108 in a vicinity of the first position of the target device 124, as determined in step 706. The first subset may include, for example, the ESLs 108 located in a first area. The first area may correspond to, for example, an aisle associated with one or more gondolas within the environment.

As described above with reference to FIG. 6, constraining the ESLs 108 (and positioning measurements) to those located closest to the target device 124 helps improve positioning accuracy and performance. Therefore, the server 122 at step 710 may activate the first subset to obtain additional signal measurements for the target device 124. At step 710, the server 122 may activate the first subset by sending a command message directing each ESL 108 determined to be in a vicinity of the target device 124 (e.g., in the same aisle as the target device 124) to collect and report positioning measurements of positioning signals exchanged (or received) from the target device 124. At step 712, the ESLs 108 in the first subset may wake up in response to receiving the command message from the server 122 and exchange positioning signals with the target device 124. The additional positioning measurements may then be transmitted to the server 122 by the first subset of ESLs 108 at step 714.

Then, the server 122 may make refinements to position location determinations using the reported positioning measurements. At step 716, the server 122 may determine a second position of the target device 124 based on the additional positioning measurements received at step 714. The second position of the target device 124 may be a refined version of the first position.

In some embodiments, the server 122 may perform an optional step 718 to identify a second subset of the ESLs 108 to further refine the position of the target device 124 based on a third set of positioning measurements received from the second subset. The second subset may include, for example, the ESLs 108 corresponding to a gondola or a shelf of the gondola determined to be located closest to the target device 124 based on the RSSIs received from the first subset. As described above, any number of additional iterations of the positioning process may be performed, e.g., until a desired level of granularity or ESL sub-selection (e.g., at the gondola-level or shelf-level) is reached or until an associated positioning error with the determination at block 716 falls below a maximum positioning error tolerance.

Figure 8:
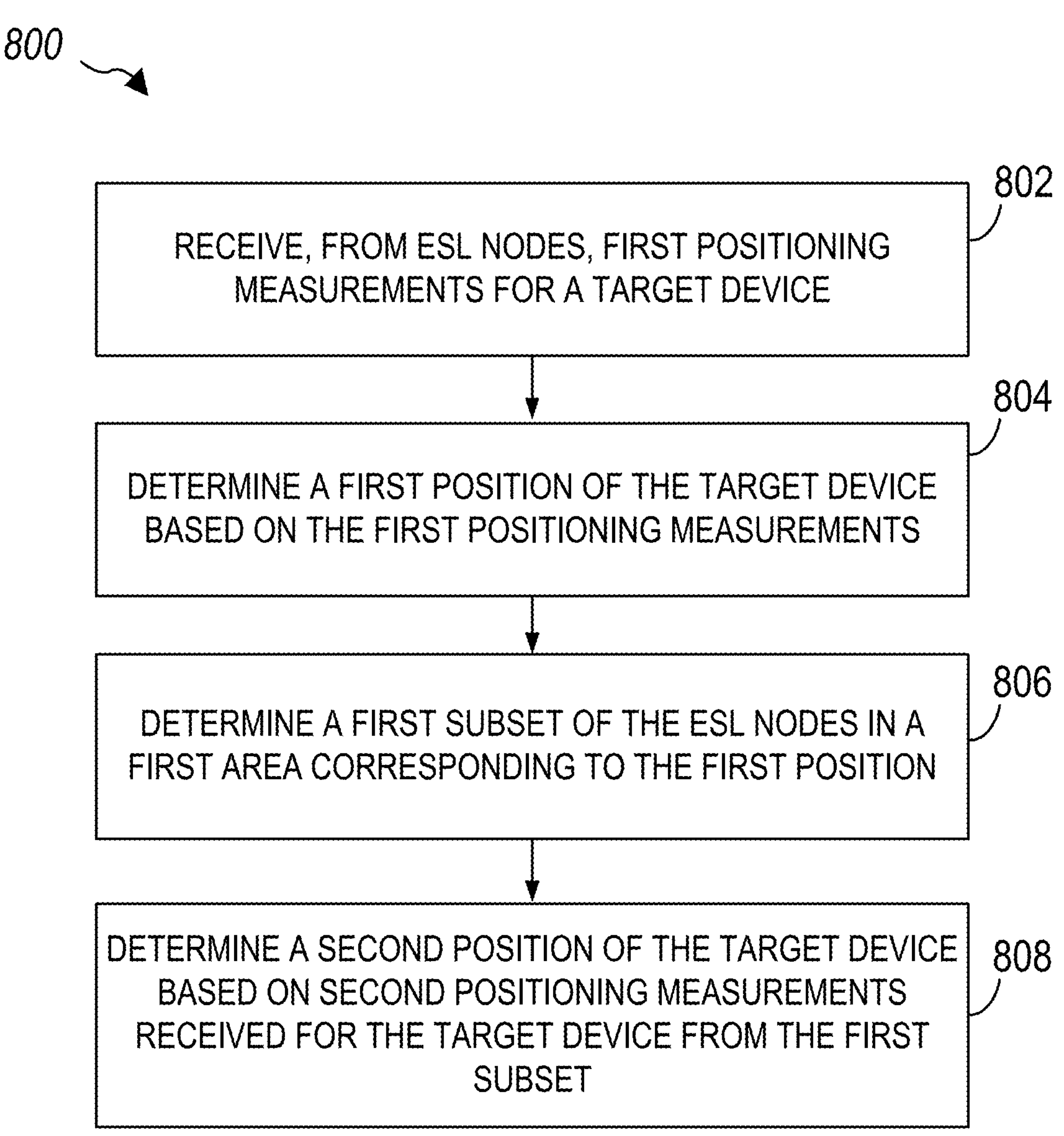
FIG. 8 is a flow chart of an example method for iteratively positioning a target device within an indoor environment according to some embodiments of this disclosure.

FIG. 8 is a flow chart of an example method 800 for iteratively positioning a target device within an indoor environment according to some embodiments of this disclosure. For discussion purposes, method 800 will be described using the ESL system 100 of FIG. 1B, as described above. For example, the method 800 including the operations described below may be performed by the management server 122 of the ESL system 100, as described above. The method 800 of FIG. 8 may include operations described with reference to the server 122 of FIG. 7 or other operations described with reference to FIG. 5A, 5B, or 6. Method 800 begins at block 802, which includes receiving, from ESL nodes, first positioning measurements for a target device. At block 804, a first position of the target device is determined based on the first positioning measurements. At block 806, a first subset of the ESL nodes in a first area corresponding to the first position is determined. At block 808, a second position of the target device is determined based on second positioning measurements received for the target device from the first subset.

It is noted that one or more blocks (or operations) described with reference to FIGS. 1-4 may be combined with one or more blocks (or operations) described with reference to another of the figures. For example, one or more blocks (or operations) of FIG. 8 may be combined with one or more blocks (or operations) of FIGS. 1-4.

In one or more aspects, techniques for supporting ESL systems may include additional aspects, such as any single aspect or any combination of aspects described below or in connection with one or more other processes or devices described elsewhere herein.

In a first aspect, a method comprises: receiving, by a server from electronic shelf label (ESL) nodes, first positioning measurements for a target device; determining, by the server, a first position of the target device based on the first positioning measurements; determining, by the server, a first subset of the ESL nodes in a first area corresponding to the first position; and determining, by the server, a second position of the target device based on second positioning measurements received for the target device from the first subset.

In a second aspect, in combination with the first aspect, the method further comprises: identifying, by the server from among the first subset, a second subset of the ESL nodes in a second area corresponding to the second position; and determining, by the server, a third position of the target device based on third positioning measurements received for the target device from the second subset.

In a third aspect, in combination with one or more of the first aspect or the second aspect, the third position corresponds to a third area, wherein the third area is smaller than the second area, and wherein the second area is smaller than the first area.

In a fourth aspect, in combination with one or more of the first aspect through the third aspect, the first area corresponds to an aisle associated with one or more gondolas, the second area corresponds to at least one gondola of the one or more gondolas, and the third area corresponds to a shelf associated with the at least one gondola.

In a fifth aspect, in combination with one or more of the first aspect through the fourth aspect, the method further comprises: transmitting, by the server to each ESL node in the first subset, a command to activate the ESL node to receive positioning signals from the target device.

In a sixth aspect, in combination with one or more of the first aspect through the fifth aspect, the method further comprises: determining the first area based on the first position of the target device relative to a known topology of the ESL nodes; and selecting the first subset of the ESL nodes in the first area that satisfy one or more selection criteria based on the first positioning measurements.

In a seventh aspect, in combination with one or more of the first aspect through the sixth aspect, the first positioning measurements include received signal strength indicator (RSSI) measurements of radio signals received by each ESL node in the first area from the target device, and the one or more selection criteria include a minimum RSSI criterion specifying a minimum RSSI threshold for the ESL nodes in the first area to be selected for the first subset.

In an eighth aspect, in combination with one or more of the first aspect through the seventh aspect, the first positioning measurements are received from each ESL node in the first area with one or more location identifiers for a location of the corresponding ESL node relative to the known topology, and the one or more location identifiers include one or more of an aisle identifier (ID), a gondola ID, and a shelf ID.

In a ninth aspect, in combination with one or more of the first aspect through the eighth aspect, the one or more selection criteria further include a maximum number criterion specifying a maximum limit for a number of the ESL nodes in the first area selected for the first subset.

In a tenth aspect, in combination with one or more of the first aspect through the ninth aspect, the maximum number criterion corresponds to a first hyperparameter of a model used to determine the first position based on a weighted average of ESL positions corresponding to the first subset, and the model includes a second hyperparameter corresponding to a ranking metric used to rank and assign weights to the respective ESL positions based on the RSSI measurements received from each ESL node in the first subset.

In an eleventh aspect, an apparatus includes a memory storing processor-readable code and at least one processor coupled to the memory, wherein the at least one processor configured to execute the processor-readable code to cause the at least one processor to perform operations comprising: receiving, from electronic shelf label (ESL) nodes, first positioning measurements for a target device; determining a first position of the target device based on the first positioning measurements; determining a first subset of the ESL nodes in a first area corresponding to the first position; and determining a second position of the target device based on second positioning measurements received for the target device from the first subset.

In a twelfth aspect, in combination with the eleventh aspect, the operations further comprise: identifying, from among the first subset, a second subset of the ESL nodes in a second area corresponding to the second position; and determining a third position of the target device based on third positioning measurements received for the target device from the second subset.

In a thirteenth aspect, in combination with one or more of the eleventh aspect or the twelfth aspect, the third position corresponds to a third area, the third area is smaller than the second area, and the second area is smaller than the first area.

In a fourteenth aspect, in combination with one or more of the eleventh aspect through the thirteenth aspect, the first area corresponds to an aisle associated with one or more gondolas, the second area corresponds to at least one gondola of the one or more gondolas, and the third area corresponds to a shelf associated with the at least one gondola.

In a fifteenth aspect, in combination with one or more of the eleventh aspect through the fourteenth aspect, the operations further comprise transmitting, to each ESL node in the first subset, a command to activate the ESL node to receive positioning signals from the target device.

In a sixteenth aspect, in combination with one or more of the eleventh aspect through the fifteenth aspect, the operations for determining the first subset comprise: determining the first area based on the first position of the target device relative to a known topology of the ESL nodes; and selecting the first subset of the ESL nodes in the first area that satisfy one or more selection criteria based on the first positioning measurements.

In a seventeenth aspect, in combination with one or more of the eleventh aspect through the sixteenth aspect, the first positioning measurements include received signal strength indicator (RSSI) measurements of radio signals received by each ESL node in the first area from the target device, and the one or more selection criteria include a minimum RSSI criterion specifying a minimum RSSI threshold for the ESL nodes in the first area to be selected for the first subset.

In an eighteenth aspect, in combination with one or more of the eleventh aspect through the seventeenth aspect, the first positioning measurements are received from each ESL node in the first area with one or more location identifiers for a location of the corresponding ESL node relative to the known topology, and the one or more location identifiers include one or more of an aisle identifier (ID), a gondola ID, and a shelf ID.

In a nineteenth aspect, in combination with one or more of the eleventh aspect through the eighteenth aspect, the one or more selection criteria further include a maximum number criterion specifying a maximum limit for a number of the ESL nodes in the first area selected for the first subset.

In a twentieth aspect, in combination with one or more of the eleventh aspect through the nineteenth aspect, the maximum number criterion corresponds to a first hyperparameter of a model used to determine the first position based on a weighted average of ESL positions corresponding to the first subset, and the model includes a second hyperparameter corresponding to a ranking metric used to rank and assign weights to the respective ESL positions based on the RSSI measurements received from each ESL node in the first subset.

In a twenty-first aspect, a non-transitory computer-readable medium stores instructions that, when executed by a processor, cause the processor to perform operations comprising: receiving, from electronic shelf label (ESL) nodes, first positioning measurements for a target device; determining a first position of the target device based on the first positioning measurements; determining a first subset of the ESL nodes in a first area corresponding to the first position; and determining a second position of the target device based on second positioning measurements received for the target device from the first subset.

In a twenty-second aspect, in combination with the twenty-first aspect, the operations further comprise: identifying, from among the first subset, a second subset of the ESL nodes in a second area corresponding to the second position; and determining a third position of the target device based on third positioning measurements received for the target device from the second subset.

In a twenty-third aspect, in combination with one or more of the twenty-first aspect or the twenty-second aspect, the third position corresponds to a third area, the third area is smaller than the second area, and the second area is smaller than the first area.

In a twenty-fourth aspect, in combination with one or more of the twenty-first aspect through the twenty-third aspect, the first area corresponds to an aisle associated with one or more gondolas, the second area corresponds to at least one gondola of the one or more gondolas, and the third area corresponds to a shelf associated with the at least one gondola.

In a twenty-fifth aspect, in combination with one or more of the twenty-first aspect through the twenty-fourth aspect, the operations further comprise transmitting, to each ESL node in the first subset, a command to activate the ESL node to receive positioning signals from the target device.

In a twenty-sixth aspect, an electronic shelf label (ESL) system comprises: ESL nodes; and a server comprising a memory and at least one processor coupled to the memory, wherein the at least one processor is configured to perform operations comprising: receiving, from the ESL nodes, first positioning measurements for a target device; determining a first position of the target device based on the first positioning measurements; determining a first subset of the ESL nodes in a first area corresponding to the first position; and determining a second position of the target device based on second positioning measurements received for the target device from the first subset.

In a twenty-seventh aspect, in combination with the twenty-sixth aspect, the operations further comprise: identifying, from among the first subset, a second subset of the ESL nodes in a second area corresponding to the second position; and determining a third position of the target device based on third positioning measurements received for the target device from the second subset.

In a twenty-eighth aspect, in combination with one or more of the twenty-sixth aspect or the twenty-seventh aspect, the third position corresponds to a third area, the third area is smaller than the second area, and the second area is smaller than the first area.

In a twenty-ninth aspect, in combination with one or more of the twenty-sixth aspect through the twenty-eighth aspect, the first area corresponds to an aisle associated with one or more gondolas, the second area corresponds to at least one gondola of the one or more gondolas, and the third area corresponds to a shelf associated with the at least one gondola.

In a thirtieth aspect, in combination with one or more of the twenty-sixth aspect through the twenty-ninth aspect, the operations further comprise transmitting, to each ESL node in the first subset, a command to activate the ESL node to receive positioning signals from the target device.

Components, the functional blocks, and the modules described herein with respect to the figures described above include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:
- receiving, by a server from electronic shelf label (ESL) nodes, first positioning measurements for a target device;
- determining, by the server, a first position of the target device based on the first positioning measurements;
- determining, by the server, a first subset of the ESL nodes in a first area corresponding to the first position; and
- determining, by the server, a second position of the target device based on second positioning measurements received for the target device from the first subset.

2. The method of claim 1, further comprising:
- identifying, by the server from among the first subset, a second subset of the ESL nodes in a second area corresponding to the second position; and
- determining, by the server, a third position of the target device based on third positioning measurements received for the target device from the second subset.

3. The method of claim 2, wherein the third position corresponds to a third area, wherein the third area is smaller than the second area, and wherein the second area is smaller than the first area.

4. The method of claim 3, wherein the first area corresponds to an aisle associated with one or more gondolas, wherein the second area corresponds to at least one gondola of the one or more gondolas, and wherein the third area corresponds to a shelf associated with the at least one gondola.

5. The method of claim 1, further comprising:
- transmitting, by the server to each ESL node in the first subset, a command to activate the ESL node to receive positioning signals from the target device.

6. The method of claim 1, wherein determining the first subset comprises:
- determining the first area based on the first position of the target device relative to a known topology of the ESL nodes; and
- selecting the first subset of the ESL nodes in the first area that satisfy one or more selection criteria based on the first positioning measurements.

7. The method of claim 6, wherein the first positioning measurements include received signal strength indicator (RSSI) measurements of radio signals received by each ESL node in the first area from the target device, and wherein the one or more selection criteria include a minimum RSSI criterion specifying a minimum RSSI threshold for the ESL nodes in the first area to be selected for the first subset.

8. The method of claim 7, wherein the first positioning measurements are received from each ESL node in the first area with one or more location identifiers for a location of the corresponding ESL node relative to the known topology, and wherein the one or more location identifiers include one or more of an aisle identifier (ID), a gondola ID, and a shelf ID.

9. The method of claim 7, wherein the one or more selection criteria further include a maximum number criterion specifying a maximum limit for a number of the ESL nodes in the first area selected for the first subset.

10. The method of claim 9, wherein the maximum number criterion corresponds to a first hyperparameter of a model used to determine the first position based on a weighted average of ESL positions corresponding to the first subset, and wherein the model includes a second hyperparameter corresponding to a ranking metric used to rank and assign weights to the respective ESL positions based on the RSSI measurements received from each ESL node in the first subset.

11. An apparatus comprising:

a memory storing processor-readable code; and at least one processor coupled to the memory, the at least one processor configured to execute the processor-readable code to cause the at least one processor to perform operations comprising:

receiving, from electronic shelf label (ESL) nodes, first positioning measurements for a target device;

determining a first position of the target device based on the first positioning measurements;

determining a first subset of the ESL nodes in a first area corresponding to the first position; and determining a second position of the target device based on second positioning measurements received for the target device from the first subset.

12. The apparatus of claim 11, wherein the operations further comprise:

identifying, from among the first subset, a second subset of the ESL nodes in a second area corresponding to the second position; and determining a third position of the target device based on third positioning measurements received for the target device from the second subset.

13. The apparatus of claim 12, wherein the third position corresponds to a third area, wherein the third area is smaller than the second area, and wherein the second area is smaller than the first area.

14. The apparatus of claim 13, wherein the first area corresponds to an aisle associated with one or more gondolas, wherein the second area corresponds to at least one gondola of the one or more gondolas, and wherein the third area corresponds to a shelf associated with the at least one gondola.

15. The apparatus of claim 11, wherein the operations further comprise transmitting, to each ESL node in the first subset, a command to activate the ESL node to receive positioning signals from the target device.

16. The apparatus of claim 11, wherein the operations for determining the first subset comprise:

determining the first area based on the first position of the target device relative to a known topology of the ESL nodes; and selecting the first subset of the ESL nodes in the first area that satisfy one or more selection criteria based on the first positioning measurements.

17. The apparatus of claim 16, wherein the first positioning measurements include received signal strength indicator (RSSI) measurements of radio signals received by each ESL node in the first area from the target device, and wherein the one or more selection criteria include a minimum RSSI criterion specifying a minimum RSSI threshold for the ESL nodes in the first area to be selected for the first subset.

18. The apparatus of claim 17, wherein the first positioning measurements are received from each ESL node in the first area with one or more location identifiers for a location of the corresponding ESL node relative to the known topology, and wherein the one or more location identifiers include one or more of an aisle identifier (ID), a gondola ID, and a shelf ID.

19. The apparatus of claim 17, wherein the one or more selection criteria further include a maximum number criterion specifying a maximum limit for a number of the ESL nodes in the first area selected for the first subset.

20. The apparatus of claim 19, wherein the maximum number criterion corresponds to a first hyperparameter of a model used to determine the first position based on a weighted average of ESL positions corresponding to the first subset, and wherein the model includes a second hyperparameter corresponding to a ranking metric used to rank and assign weights to the respective ESL positions based on the RSSI measurements received from each ESL node in the first subset.

21. A non-transitory computer-readable medium storing instructions that, when executed by a processor, cause the processor to perform operations comprising:

receiving, from electronic shelf label (ESL) nodes, first positioning measurements for a target device;

determining a first position of the target device based on the first positioning measurements;

determining a first subset of the ESL nodes in a first area corresponding to the first position; and determining a second position of the target device based on second positioning measurements received for the target device from the first subset.

22. The non-transitory computer-readable medium of claim 21, wherein the operations further comprise:

identifying, from among the first subset, a second subset of the ESL nodes in a second area corresponding to the second position; and determining a third position of the target device based on third positioning measurements received for the target device from the second subset.

23. The non-transitory computer-readable medium of claim 22, wherein the third position corresponds to a third area, wherein the third area is smaller than the second area, and wherein the second area is smaller than the first area.

24. The non-transitory computer-readable medium of claim 23, wherein the first area corresponds to an aisle associated with one or more gondolas, wherein the second area corresponds to at least one gondola of the one or more gondolas, and wherein the third area corresponds to a shelf associated with the at least one gondola.

25. The non-transitory computer-readable medium of claim 21, wherein the operations further comprise transmitting, to each ESL node in the first subset, a command to activate the ESL node to receive positioning signals from the target device.

26. An electronic shelf label (ESL) system comprising:

ESL nodes; and a server comprising a memory and at least one processor coupled to the memory, wherein the at least one processor is configured to perform operations comprising:

receiving, from the ESL nodes, first positioning measurements for a target device;

determining a first position of the target device based on the first positioning measurements;

determining a first subset of the ESL nodes in a first area corresponding to the first position; and determining a second position of the target device based on second positioning measurements received for the target device from the first subset.

27. The ESL system of claim 26, wherein the operations further comprise:

identifying, from among the first subset, a second subset of the ESL nodes in a second area corresponding to the second position; and determining a third position of the target device based on third positioning measurements received for the target device from the second subset.

28. The ESL system of claim 27, wherein the third position corresponds to a third area, wherein the third area is smaller than the second area, and wherein the second area is smaller than the first area.

29. The ESL system of claim 28, wherein the first area corresponds to an aisle associated with one or more gondolas, wherein the second area corresponds to at least one gondola of the one or more gondolas, and wherein the third area corresponds to a shelf associated with the at least one gondola.

30. The ESL system of claim 26, wherein the operations further comprise transmitting, to each ESL node in the first subset, a command to activate the ESL node to receive positioning signals from the target device.

* * * * *